United States Patent
Räsänen

(10) Patent No.: US 6,192,055 B1
(45) Date of Patent: Feb. 20, 2001

(54) METHOD AND AN ARRANGEMENT FOR SETTING UP A DATA CALL, AND AN ADAPTER EQUIPMENT

(75) Inventor: Juha Räsänen, Espoo (FI)

(73) Assignee: Nokia Telecommunications Oy, Espoo (FI)

( * ) Notice: Under 35 U.S.C. 154(b), the term of this patent shall be extended for 0 days.

(21) Appl. No.: 09/029,760
(22) PCT Filed: Jun. 25, 1997
(86) PCT No.: PCT/FI97/00408
    § 371 Date: Mar. 2, 1998
    § 102(e) Date: Mar. 2, 1998
(87) PCT Pub. No.: WO98/00998
    PCT Pub. Date: Jan. 8, 1998

(30) Foreign Application Priority Data

Jun. 28, 1996 (FI) .......................................... 962700

(51) Int. Cl.$^7$ ........................................ H04J 3/22
(52) U.S. Cl. .................. 370/465; 370/338; 455/403; 455/422; 455/425
(58) Field of Search .................. 370/465, 464, 370/349, 350, 338, 329; 455/425, 422, 403

(56) References Cited

U.S. PATENT DOCUMENTS 5,396,539 * 3/1995 Slekys et al. ............. 379/59
5,920,812 * 7/1999 Palviainen ............. 455/417

FOREIGN PATENT DOCUMENTS

| 178906 | 9/1981 | (HU) . |
| 215 874 | 1/1996 | (HU) . |
| 9600164 | 6/1996 | (HU) . |
| 9503382 | 10/1996 | (HU) . |
| 9516330 | 6/1995 | (WO) . |
| 95/163330 * | 6/1995 | (WO) .......................... H04Q/7/22 |

OTHER PUBLICATIONS

European Telecommunication Standard, ETS 300 501, Sep. 1994, Reference: GSM 02.02, European digital cellular telecommunications system (Phase 2); pp. 1–13.

European Telecommunication Standard, ETS 300 502, Sep. 1994, Reference: DE/SMG–010203P, European digital cellular telecommunications system (Phase 2); pp. 1–21.

European Telecommunication Standard, ETS 300 538, May 1995, 2$^{nd}$ Edition, Reference: RE/SMG–040345P, European digital cellular telecommunications system (Phase 2); pp. 1–46.

European Telecommunication Standard, ETS 300 562, May 1995, 3$^{rd}$ Edition, Reference: RE/SMG–040421PR2, European digital cellular telecommunications system (Phase 2); pp. 1–21.

GSM Recommendation 05.3, Channel Coding, Oct., 1994, version 3.6.1, pp. 1–22.

(List continued on next page.)

Primary Examiner—Huy D. Vu
Assistant Examiner—Dung Trinh
(74) Attorney, Agent, or Firm—Pillsbury Madison & Sutro LLP

(57) ABSTRACT

The invention relates to an adapter equipment (IWF), a method and an arrangement for setting up a data call terminating at a subscriber in a telecommunication network. In the invention, adaptation functions of two or more data services are integrated into a single adapter pool that has one common MSISDN number shared by all the data services. After the connection has been set up, the IWF does not try to synchronize itself according to any data service towards another network but it monitors a traffic channel arriving from the other network (ISDN, PSTN) in order to identify the data service used by the calling terminal equipment. After the IWF has identified the data service, it starts operating in the manner required by the identified data service and data transmission may begin.

12 Claims, 6 Drawing Sheets

OTHER PUBLICATIONS

European Telecommunication Standard, ETS 300 604, Oct. 1996, Fifth Edition, Reference: RE/SMG–040907PR4, GSM, Digital cellular telecommunications system, pp. 1–62.

ITU–T Recommendation V.22, Telecommunication Standardization Sector of ITU, pp.1–15.

ITU–T Recommendation v.22 bis, Telecommunication Standardization Sector of ITU, pp. 1–17.

ITU–T Recommendation v.32, Telecommunication Standardization Sector of ITU (Mar. 1993), pp. 1–23.

GSM Recommendation 08.60, Inband Control of Remote Transcoders and Rate Adaptors, Oct. 1990, pp. 1–29.

ITU–T Recommendation V.24, (Mar. 1993), Telecommunication Standardization Sector of ITU, pp. 1–19.

CCITT, The International Telegraph and Telephone Consultative Committee, Recommendation V.110,(Sep. 1992), Data Communication Over the Telephone Network, pp. 1–58.

European Telecommunication Standard, ETS 300 583, Jul. 1994, Reference: GSM 07.02, European digital cellular telecommunications system (Phase 2); pp. 1–21.

European Telecommunication Standard, ETS 300 563, Sep. 1994, Reference: GSM 04.22, European digital cellular telecommunications system (Phase 2); pp. 1–63.

* cited by examiner

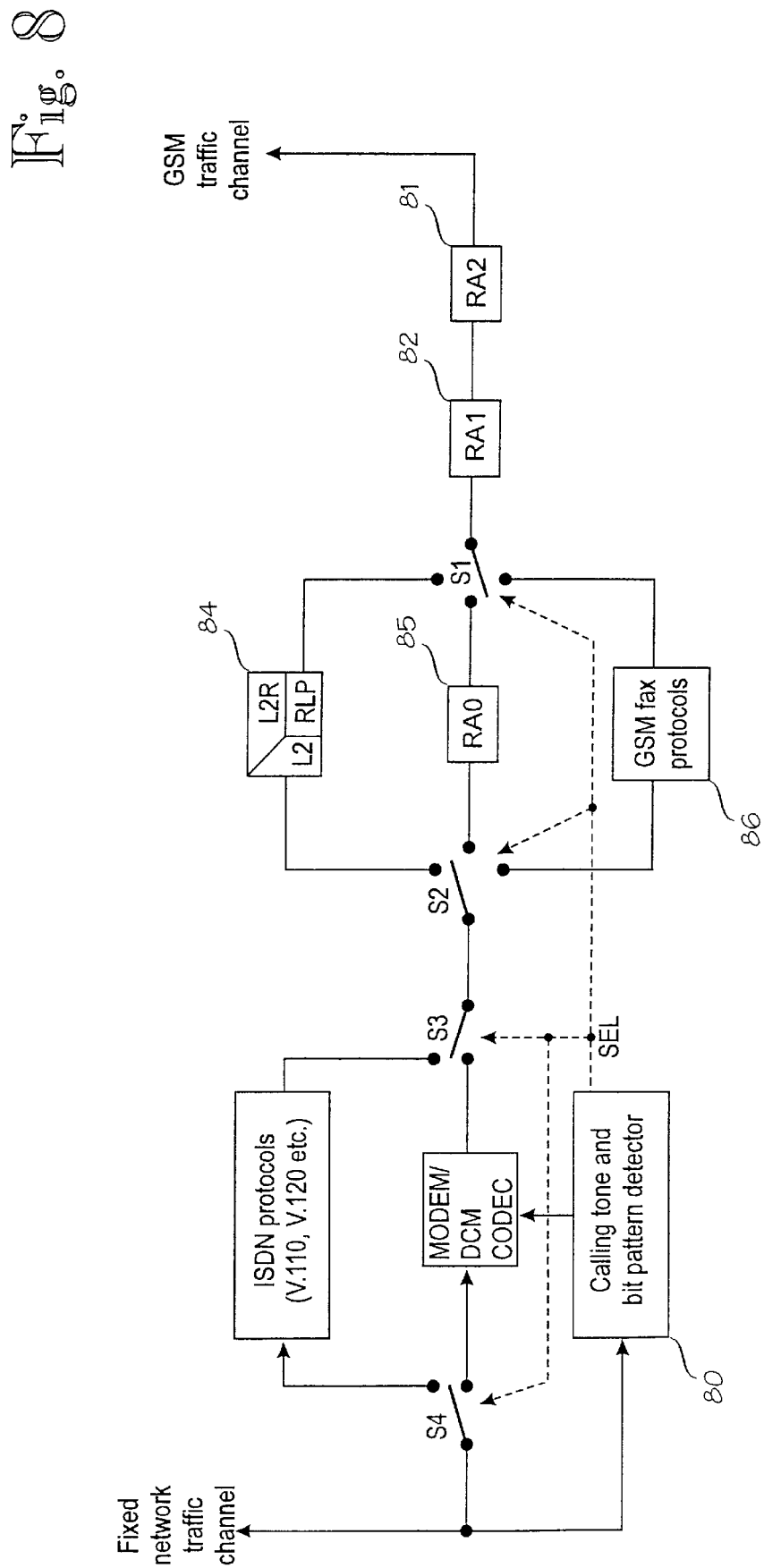

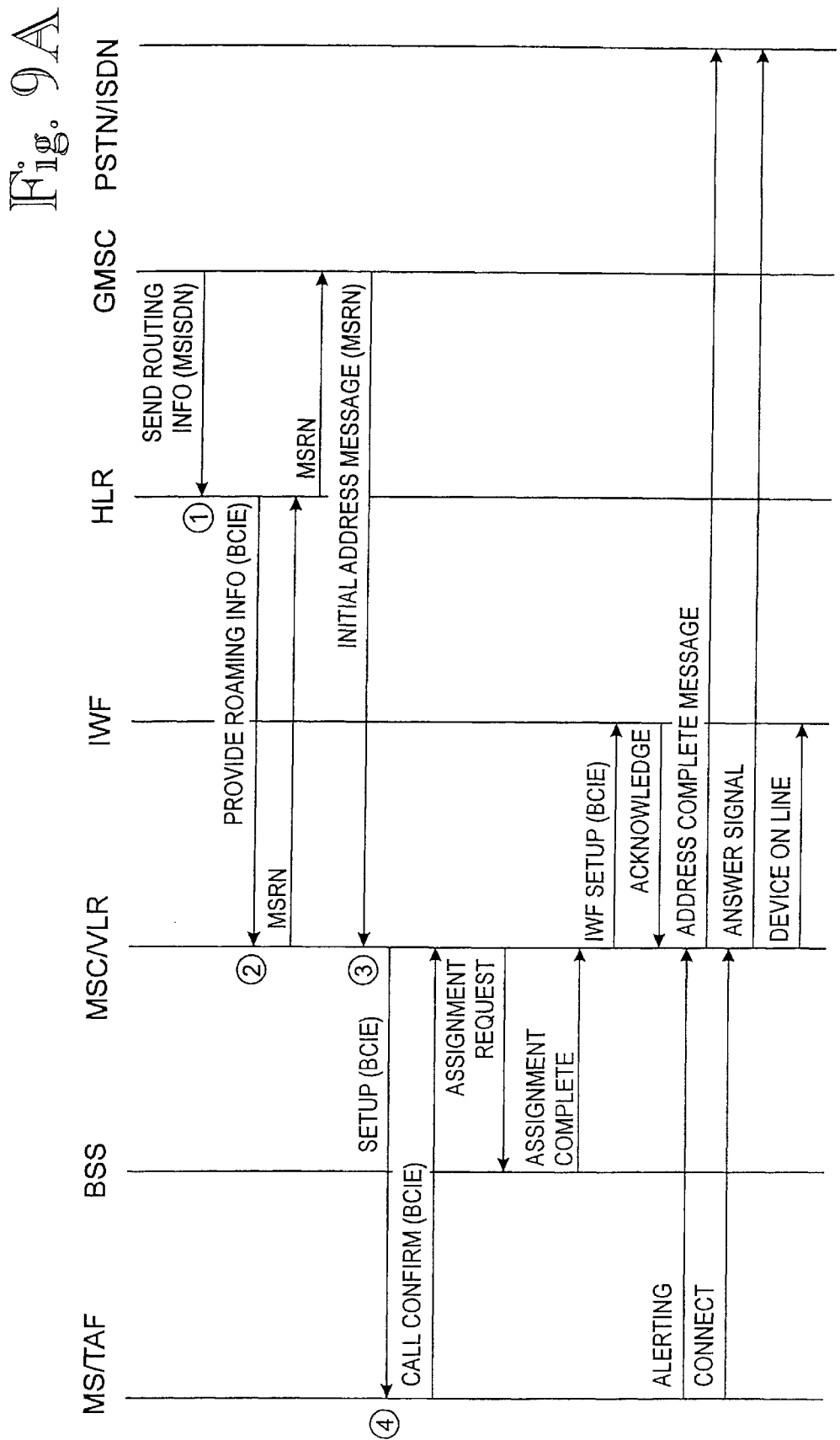

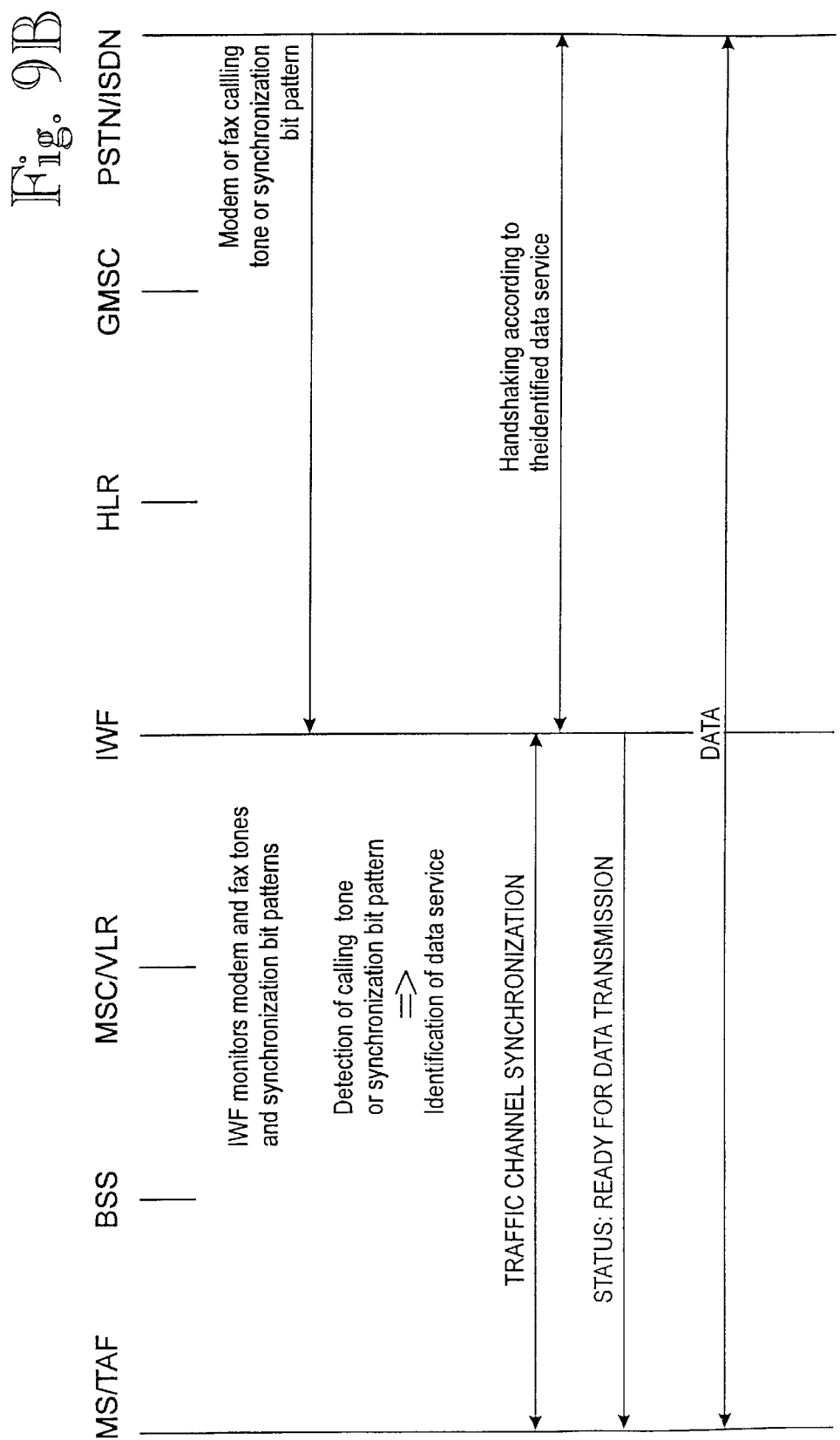

METHOD AND AN ARRANGEMENT FOR SETTING UP A DATA CALL, AND AN ADAPTER EQUIPMENT

This application is the national phase of international application PCT/FI97/00408 filed Jun. 25, 1997 which designated the U.S.

FIELD OF THE INVENTION

The invention relates to implementing data services in telecommunication networks, especially in mobile networks and wireless local loop (WLL) systems.

BACKGROUND OF THE INVENTION

In addition to the normal speech service, modern mobile systems also provide subscribers with different data transmission properties, e.g. asynchronous bearer services or a facsimile Group 3 eleservice.

Data services usually employ a specified communication protocol within a mobile network. For example the European digital mobile system GSM (Global System for Mobile Communications) comprises a UDI-coded rate adaptation protocol based on CCITT V.110, and further a radio link protocol (RLP) for non-transparent services, and a GSM facsimile protocol. A digital connection from a mobile network to the fixed network, such as an integrated services digital network (ISDN) or a public switched telephone network (PSTN), may employ protocols different from the protocols within the mobile network. Examples of protocols include CCITT V.110 and V.120 rate adaptation protocols in the ISDN network, modem protocols (CCITT V.22, V.22bis, V.32), and facsimile Group 3.

A mobile system comprises adaptation functions for adapting a data connection set up within the mobile network to the protocols used by terminal equipments and other telecommunication networks. The adaptation functions typically include a terminal adaptation function (TAF) located at an interface between a mobile station and a data terminal equipment connected thereto, and an interworking function (IWF) at an interface between the mobile network and another telecommunication network, usually in connection with a mobile services switching centre. A mobile services switching centre usually comprises different types of adapter equipment pools for supporting different data services and protocols, for example a modem pool with modems and facsimile adapters for modem and facsimile services, a UDI/RDI rate adaptation pool, etc. FIG. 1 illustrates a GSM network comprising IWF adapter equipment pools in a mobile services switching centre (MSC).

The signalling within a mobile network usually supports the transmission of data-service-specific parameters. However, the signalling does not often support the transmission of these parameters in all the networks via which a call is routed. This happens for example when a call arrives from or is routed via the PSTN. In such a case, the mobile network should be able to conclude in some other manner the data service and the adapter equipment that an incoming call requires, for example.

A known solution to this problem is a multinumbering scheme where a mobile subscriber has as many MSISDN (mobile subscriber ISDN) numbers as he has different services to which he wants to receive incoming calls. In a multinumbering scheme, a calling subscriber dials the one of the mobile subscriber's MSISDN numbers that corresponds to the desired service. In the GSM system, the subscriber services are determined in the home location register (HLR) of the subscriber, which also stores permanently other subscriber data. The HLR also stores information on the correspondence between the MSISDN numbers and the services of the subscriber. The HLR also assigns to each MSISDN number a BCIE (bearer capability information element) that indicates the call type and the bearer services and protocol required in the call. The IWF can be configured according to this data. According to the current GSM recommendations (GSM TS 09.07), a subscriber has a dedicated MSISDN number for each service. A subscriber may have, for example, a speech service, an asynchronous 3.1 kHz bearer service (modem), an asynchronous UDI bearer service and a facsimile Group 3 teleservice, which means that the subscriber needs four MSISDN numbers. The plurality of MSISDN numbers is problematic both for the user and the network operator.

Networks where a terminal equipment of the fixed network is connected to the network via a radio connection instead of a subscriber cable are called wireless local loop (WLL) networks or radio local loop (RLL) networks. A WLL may be based on a mobile network, such as the GSM. There are several configurations by means of which a GSM-based WLL system can be implemented. FIG. 2 shows a configuration where the GSM network is used as such. Instead of a normal mobile station (MS), the terminal equipment comprises a fixed subscriber base station 22 at the subscriber's premises and a PSTN telephone 21 connected to the subscriber base station 22. FIG. 3 in turn shows a configuration where a base station controller (BSC), an MSC, an HLR and a visitor location register VLR in the GSM network are replaced with a WLL-specific network element, i.e. a WLL access node. The WLL access node may contain for example the following functions: transcoding, echo cancellation, basic functions of the location registers (VLR, HLR) and adaptation functions (IWF) for data services. In each case, an IWF is required at the network side (in the MSC or the WLL access node) if data services are supported.

Such a large number of services and protocols creates difficulties for network operators and users. In order for a mobile subscriber to be able to make and receive calls requiring different protocols, he must order several network services from the network operator. For the operator it is problematic that each subscriber needs a plurality of MSISDN numbers, which uses up the numbering space of the network. Also, definition of the services in the network databases consumes the capacity of the databases.

BRIEF SUMMARY OF THE INVENTION

The object of the invention is to decrease the MSISDN numbers needed by a subscriber for the use of different data services in a telecommunication system.

The invention relates to a method for setting up a data call terminating at a subscriber. The invention is characterized by
  receiving a call from another network to an MSISDN number of the subscriber that is common to two or more data services having adaptation functions integrated into the same adapter equipment,
  allocating the adaptation resource required by the data call from said integrated adapter equipment,
  monitoring a traffic channel arriving from the other network by means of the allocated integrated adaptation resource,
  identifying the data service used by the calling party by means of signalling, synchronization or some other feature that is characteristic of the service, configuring said integrated adaptation resource to operate in the manner according to said identified data service towards the other network.

The invention also relates to an arrangement according to claim 5 and to an adapter equipment according to claim 9.

In the invention, different adapter equipments for different data services are integrated at the network side into a single pool where all the data services share one MSISDN number. The integrated pool supports the protocols and functions of all the data services belonging to the pool. When a terminating call is made to the MSISDN number of the integrated pool, the pool is connected to the line. Protocol or service definitions possibly provided in a service specification related to this MSISDN number, obtained for example from the switching centre during the call set-up, are not taken into account if they relate to distinguishing between data services within the pool. In other words, the integrated pool does not try to operate according to any one of the data services towards the calling subscriber but instead it monitors the incoming traffic channel in order to identify the data service and protocol used by the terminal equipment. Identification of a data service is based on detecting synchronization or signalling that is characteristic of the service. After the integrated pool has identified the data service of the calling party, it starts to operate in the manner required by the identified data service.

Any function characteristic of a data service can be used to identify the service. For example an asynchronous 3.1 kHz bearer service (modem service) can be identified on the basis of the modem calling tone (1300 Hz), a modem call or response, or a digital bit sequence or frame indicating the modem characteristics. A facsimile Group 3 teleservice can be identified for example on the basis of a calling tone (1100 Hz), a modem call or response, or a digital bit sequence or frame indicating the modem characteristics. An asynchronous UDI/RDI bearer service can be identified at least by means of a digital synchronization pattern. For example the CCITT V.110 protocol can be identified by means of a V.110 synchronization frame. The CCITT V.120 protocol can be identified by means of a V.120 frame flag, and the identification can also be confirmed by means of a link set-up message.

It is also possible to implement only partial integration of data services in one adapter equipment pool. For example, if only the asynchronous 3.1 kHz bearer service and the facsimile Group 3 teleservice are integrated into the same adapter equipment pool, these two data services share an MSISDN number, but the UDI/RDI service has its own MSISDN number.

The present invention decreases the MSISDN numbers needed by a subscriber when using different data services. At the minimum the subscriber only needs one MSISDN number for a data service. This eliminates the problems caused by the plurality of the numbers to the subscriber and the network operator.

BRIEF DESCRIPTION OF THE DRAWINGS

In the following, the invention will be described in greater detail by means of preferred embodiments with reference to the accompanying drawings, in which FIG. 8 is a block diagram of an integrated channel controller, and FIGS. 9A and 9B are signalling charts illustrating a data call according to the invention.

PREFERRED EMBODIMENTS OF THE INVENTION

The present invention can be used in all digital telecommunication systems, such as mobile communications systems, where the data services utilize two or more different communication protocols towards the fixed network, such as the ISDN or the PSTN. There are several multiple access modulation techniques that facilitate communication with a large number of mobile users. These techniques include time division multiple access (TDMA), code division multiple access (CDMA) and frequency division multiple access (FDMA). The physical concept of the traffic channel varies in different multiple access methods and it is primarily defined by means of a time slot in TDMA systems, a spreading code in CDMA systems and a radio channel in FDMA systems, or a combination thereof and so forth. However, the basic idea of the present invention is independent of the type of the traffic channel and the multiple access method used.

The present invention is particularly suitable for data transmission applications in the pan-European digital mobile system GSM (Global System for Mobile Communications) and in other GSM-based systems, such as the DCS1800 (Digital Communication System) and the US digital cellular system PCS (Personal Communication System), and in WLL systems based on the aforementioned systems. The invention will be described below by using the GSM mobile system as an example. The structure and operation of the GSM system are well known to a person skilled in the art and they are defined in the GSM specifications of the ETSI (European Telecommunications Standards Institute). Reference is also made to the *GSM System for Mobile Communication* by M. Mouly and M. Pautet, Palaiseau, France, 1992; ISBN:2-9507190-0-7.

Figure 1:
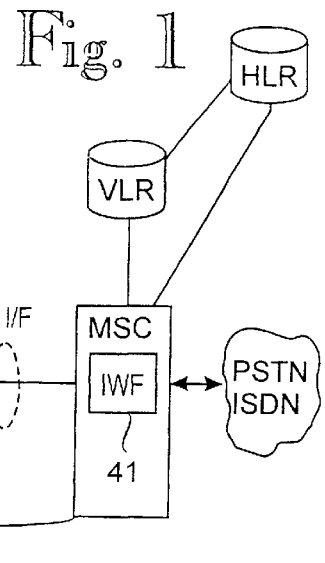
FIG. 1 shows a GSM mobile system.

The basic structure of the GSM system is shown in FIG. 1. The GSM structure consists of two parts: a base station system (BSS) and a network subsystem (NSS). The BSS and the MSs communicate via radio connections. In a BSS, each cell is served by a base station (BTS). A number of BTSs are connected to the BSC, the function of which is to control radio frequencies and channels used by a BTS. The BSCs are connected to an MSC. Certain MSCs are connected to other telecommunication networks, such as the PSTN, and they comprise gateway functions for calls terminating at and originating from these networks. These MSCs are known as gateway MSCs (GMSC).

There are two basic types of databases related to the routing of calls. There is the home location register (HLR) that stores the subscriber data of all network subscribers permanently or semi-permanently, including information on the services to which the subscriber has access and on the current location of the subscriber. Another type of register is the visitor location register (VLR) that is usually connected to one MSC but that may serve several MSCs, however. It is common that a VLR is integrated into an MSC. This integrated network element is known as a visitor MSC (VMSC). Whenever an MS is active (registered and able to make or receive calls), most of the mobile subscriber data concerning the MS and stored in the HLR is copied to the VLR of the MSC in the area of which the MS is located.

Further with reference to FIG. 1, in the GSM system a data connection is set up between a terminal adaptation function (TAF) 31 of the MS and an interworking function (IWF) 41 located in the mobile network. In data transmission in the GSM network, this connection is a V.110 rate-adapted UDI-coded digital full duplex connection adapted to V.24 interfaces. In this context, a V.110 connection is a digital transmission channel that was originally developed for ISDN technology and that is adapted to the V.24 interface and provides a possibility of also transmitting V.24 statuses (control signals). The CCITT recommendation for a V.110 rate-adapted connection is disclosed in the CCITT Blue Book: V.110. The CCITT recommendation for a V.24 interface is disclosed in the CCITT Blue Book: V.24. In non-transparent data services, a GSM connection also utilizes a radio link protocol (RLP). The TAF adapts a data terminal equipment (DTE) connected to the MS to the aforementioned GSM V.110 connection that is set up over a physical connection utilizing one or several traffic channels. The IWF interfaces the GSM V.110 data connection to another V.110 or V.120 network, such as the ISDN or another GSM network, or to some other transit network, such as the PSTN. The CCITT recommendation for a V.120 rate-adapted connection is disclosed in the CCITT White Book: V.120.

As described above, modern mobile systems support different tele and bearer services. The bearer services of the GSM system are determined in the GSM specification 02.02, version 5.0.1, and the teleservices are defined in the GSM specification 02.03, version 5.0.1.

Figure 4:
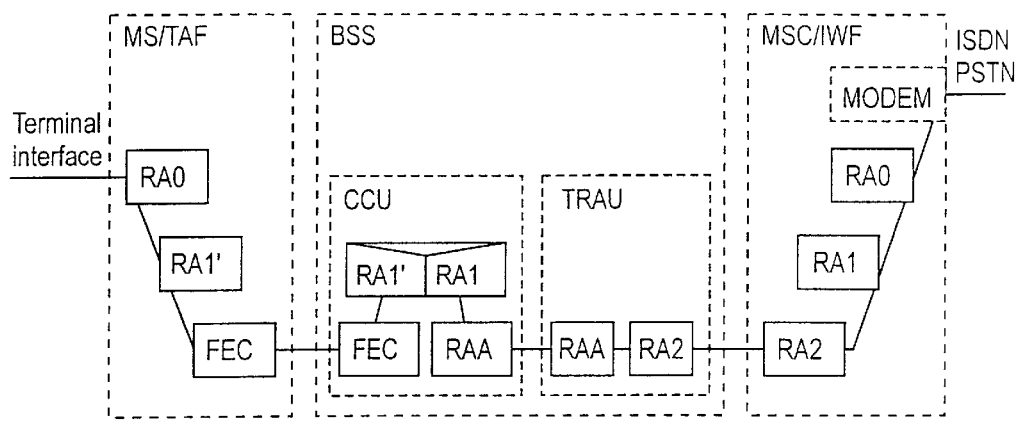
FIGS. 4, 5 and 6 show protocols and functions required in the GSM system in transparent and non-transparent GSM bearer services and in a transparent facsimile Group 3 service.
Figure 5:
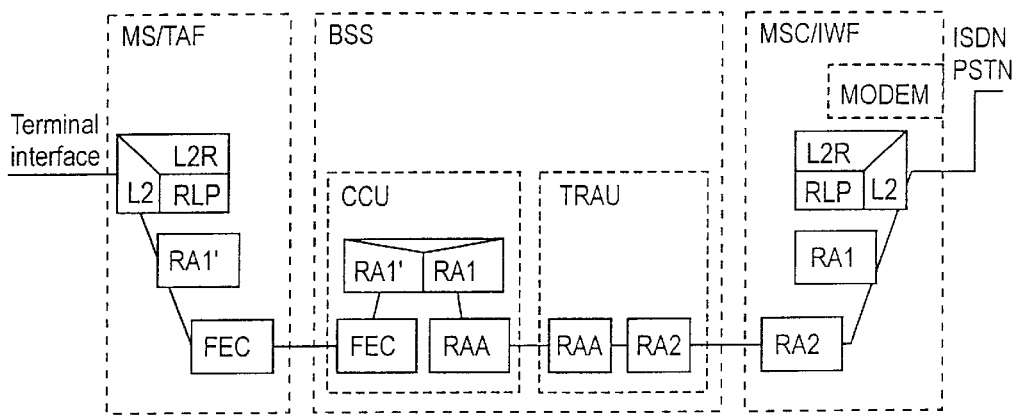
Figure 6:
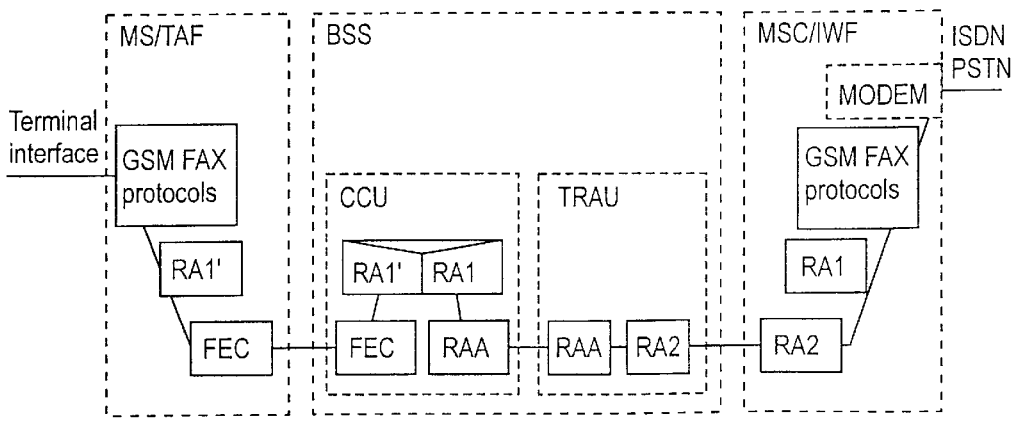

FIGS. 4, 5 and 6 show examples of protocols and functions required in the IWF (either in the MSC or in the WLL-specific network element) for transparent bearer services, non-transparent bearer services and correspondingly for a transparent facsimile Group 3 service. A non-transparent circuit-switched connection between a TAF and an IWF on a GSM traffic channel comprises several protocol layers that are common to all these services. They include different rate adaptation functions (RA), such as RA1' between the TAF and a channel codec unit (CCU) placed in the BSS, RA1 between the CCU and the IWF, RAA between the CCU and a transcoder unit (TRAU) located separately from the base station, and RA2 between the TRAU and the IWF. The RA functions are defined in the GSM recommendations 04.21 and 08.20. Communication between the CCU and the TRAU is defined in the GSM recommendation 08.60. At the radio interface, RA1' rate-adapted information is also channel-coded in the manner defined in the GSM recommendation 5.03, which is illustrated by blocks FEC in the MS and the CCU. The IWF and the TAF also comprise higher level protocols that are specific for each service. In the asynchronous transparent bearer service shown in FIG. 4, the IWF requires asynchronous-to-synchronous conversion RA0 and a modem towards the fixed network. In the asynchronous non-transparent bearer service shown in FIG. 5, the IWF requires L2R (Layer 2 Relay) and RLP protocols and a modem towards the fixed network. The L2R functionality for non-transparent character-oriented protocols is defined e.g. in the GSM recommendation 07.02. The RLP protocol is defined in the GSM recommendation 04.22. The RLP is a frame-structured balanced (HDLC-type) data transmission protocol in which error correction is based on retransmission of distorted frames at the request of the receiving party. The interface between the IWF and an audio modem MODEM, for example, is in accordance with CCITT V.24 and it is denoted by L2 in FIG. 5. In FIG. 6, the IWF requires GSM facsimile protocol functions and a modem. The GSM facsimile service is defined in the GSM recommendation 03.45.

As described above, a subscriber has conventionally had a separate MSISDN number and an adapter equipment according to the multi-numbering scheme for each data service.

Figure 7:
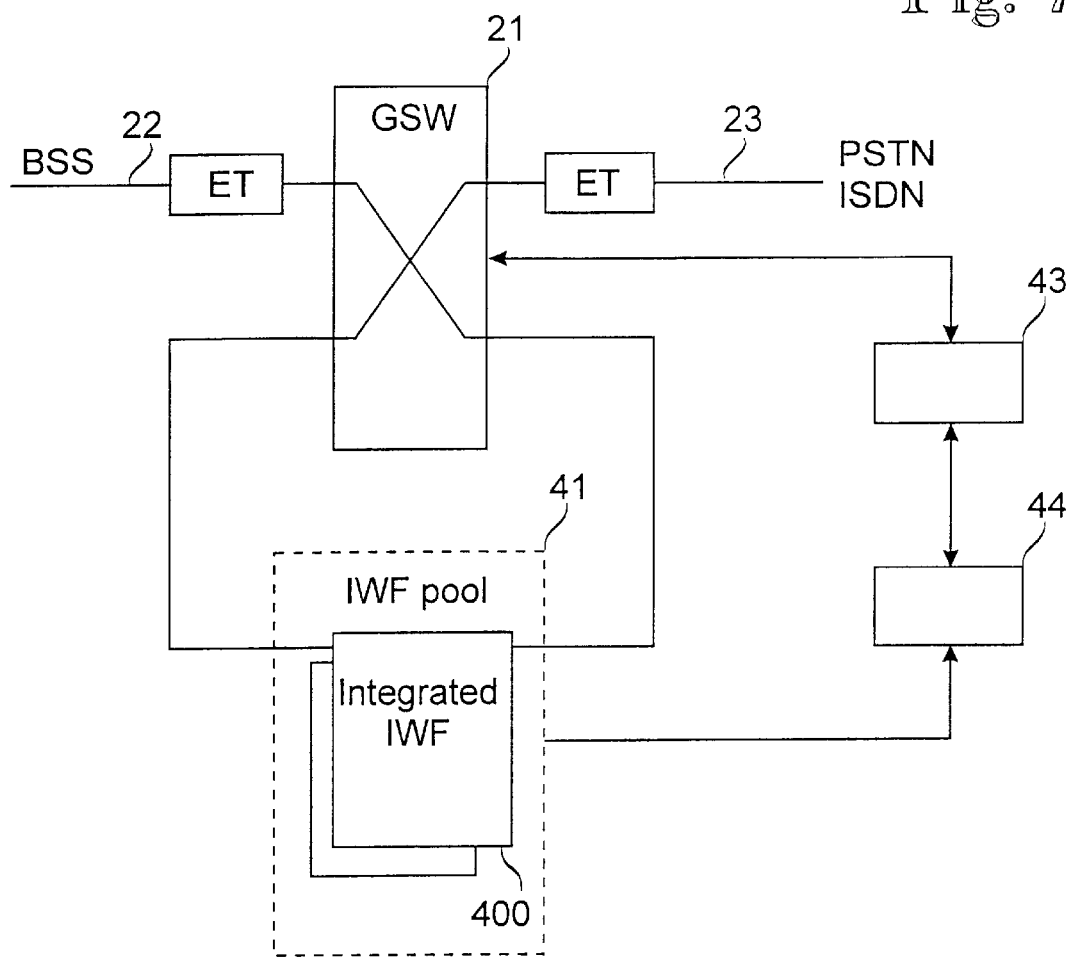
FIG. 7 illustrates an integrated adapter equipment according to the invention, placed in association with an MSC.

According to the invention, different adapter equipments of the different data services are integrated at the network side into a single pool where all data services share one MSISDN number. FIG. 7 shows an integrated adapter equipment or pool 41 according to the invention that is placed in connection with the MSC. The pool 41 comprises one or several channel controllers 400. Each channel controller 400 contains all the integrated adaptation functions that the controller should support. For example, the channel controller may support the UDI/RDI protocols (ITU-T V.110 and/or ITU-T V.120) of the fixed network, the 3.1 kHz modem functions, the facsimile Group 3 functions, and the PCM codec functions (PCM coding/decoding). The channel controller 400 may be specific for each traffic channel as in FIG. 7, or alternatively common to a group of traffic channels, e.g. to all traffic channels of a 2 Mbit/s PCM link. Each channel controller 400 of the IWF pool 41 is connected in parallel with a group switch GSW21 of the MSC. To the group switch 21 are also connected, via exchange terminations (TE), digital transmission links 22 supplied to the BSSs. Further, to the group switch 21 are also connected, via the ETs, transmission channels 23 of other telecommunication networks, such as the ISDN or the PSTN. The group switch GSW21, the IWF and the set-up, maintenance and release of data calls are controlled by call control 43. The operation of the IWF is controlled by an IWF controller 44 that selects and connects, under the supervision of the call control 43, a free channel controller 400 to the data connection for the purpose of a data call. The IWF controller may also comprise one pool controller for each IWF pool. An example of mobile services switching centres where the adapter equipment according to the invention can be applied is the DX200 MSC of Nokia Telecommunications.

FIG. 8 is a general block diagram illustrating an example of the integration of the adaptation functions shown in FIGS. 4, 5 and 6 into one channel controller 400. In this example, RA1 and RA2 rate adaptations 81 and 82 towards the GSM traffic channel and the modem and PCM codec functions 83 and ISDN protocols towards the ISDN/PSTN transmission channel are common to all the data services. The special functions of the different data services are connected between the aforementioned functions as separate branches, and the suitable one can be selected for each data service by means of selector switches S1, S2, S3 and S4. In FIG. 8, L2R/RLP functions 84 can be selected for an asynchronous non-transparent data service, RAO functions 85 can be selected for a transparent asynchronous data service, and GSM facsimile adapter functions 86 can be selected for a Group 3 facsimile service. A calling tone and binary pattern detector 80 monitors the ISDN/PSTN traffic channel and detects the signalling, synchronization or some other property that is used by the calling party of the service and that is typical of the data service. After the detector 80 has identified the data service, it controls the switches S1 and S2 to select the corresponding function 84, 85 or 86 and the switches S3 and S4 to select either the modem or RDI/UDI function, and it commands the channel controller 400 to operate towards the fixed network in the manner required by the data service.

It should be noted that in a practical application the channel controller 400 can be implemented with one signal processor, such as C541 DSP of Texas Instruments. Therefore, the detailed implementation of the channel controller 400 or the IWF pool 41 according to the invention may vary almost without limits from one application to another. The only factor essential for the invention is that the integrated IWF identifies and supports two or more data services.

In the following, the operation of an integrated adapter according to the invention and the related set-up of a data call will be described.

According to the invention, all data services integrated into a common IWF pool 41 share an MSISDN number. The service definition related to this MSISDN number is stored in the HLR together with the other subscriber data. In this service definition, each MSISDN number is assigned a GSM BCIE where the call set-up parameters that normally define the data service, such as ITC (information transfer capability), RA (rate adaptation) and modem type, can be defined as values that are unspecified or interpreted as such. In the present application, an unspecified call set-up parameter refers generally to a value which does not define any protocol for the IWF but which leads the IWF to try to identify the protocol of the fixed network terminal equipment from the traffic channel. In the preferred embodiment of the invention, the IWF ignores these call set-up parameters if they relate to distinguishing data services from one another.

In the following, the establishment of an MT call according to the invention will be described with reference to the figures. tn the example, the integrated data services include the 3.1 kHz modem service, the facsimile service or the UDI/RDI data service. It should be noted, however, that the invention is not restricted to these services but it is applicable generally to all the services.

The signalling charts of FIGS. 9A and 9B illustrate an example where a mobile-terminating (MT) data call is made from a terminal equipment (TE) of the fixed network to the MSISDN number of the mobile subscriber that is common to the integrated data services of the subscriber. In such a case, the call arrives at the mobile network from the ISDN/PSTN network but there is no signalling support over the entire connection between the mobile network and the TE for the transmission of the protocol information.

A call addressed to a common MSISDN number of mobile subscriber services arrives from the ISDN network to the GMSC of the mobile network in the form of an INITIAL ADDRESS MESSAGE (IAM). The GMSC carries out a routing information request SEND ROUTING INFO to the subscriber HLR which is determined by the called MSISDN. The routing information request also comprises the subscriber MSISDN number. The HLR retrieves from the subscriber data the GSM BCIE assigned to the called MSISDN number. In this GSM BCIE, the parameters ITC, RA and modem type have a value that is for example unspecified. The HLR then transmits to the VLR a roaming number request PROVIDE MSRN that contains the aforementioned GSM BCIE. The VLR stores the GSM BCIE and allocates a roaming number MSRN to the call. The MSRN is transmitted to the HLR that forwards it to the GMSC. The GMSC routes the call on the basis of the MSRN to the MSC in the area of which the MS is situated. The MSC then requests from the VLR information for the set-up of a future call on the basis of the MSRN. The VLR retrieves, by means of the MSRN, the BCIE previously received from the HLR and transmits it to the MSC. If the BCIE contains a complete service definition, the MSC may change the parameters in the BCIE to indicate an unspecified service. The MSC thereafter transmits to the MS a call set-up message SETUP that also contains the GSM BCIE. The MS responds with a CALL CONFIRM MESSAGE. The MSC thereafter asks the BSS to reserve the required radio channels with an ASSIGNMENT REQUEST message and the BSS acknowledges with an ASSIGNMENT COMPLETE message. The MSC thereafter reserves the required integrated IWF resources by transmitting to the IWF an IWF SETUP message that also contains the GSM BCIE. At this point, the IWF starts to operate in the manner according to the invention.

The IWF controller 44 receives a SETUP message containing the BCIE from the call control 43 of the MSC. The IWF controller 44 analyzes the BCIE and since an integrated IWF resource has been allocated to the data call, it ignores possible parameters distinguishing the data services. In other words, the IWF controller 44 does not configure the channel controller 400 (or channel controllers in the case of an HSCSD call) reserved for the data call for a certain data service, but the channel controller 400 prepares to monitor a traffic channel arriving from the fixed network. The IWF acknowledges the allocation of the resources with an ACKNOWLEDGE message. The MS informs with an ALERTING message that the called subscriber is being alerted. The MSC in turn transmits to the calling TE of the fixed network an ADDRESS COMPLETE message that indicates that the connection has been set up. The MS then transmits a CONNECT message that indicates that the called subscriber accepts the call, whereafter the MSC transmits an ANSWER SIGNAL message to the calling TE. The MSC then guides the IWF with a DEVICE ON LINE message. The IWF then starts again operating in the manner according to the invention.

The IWF controller 44 receives the DEVICE ON LINE message from the call control 43 of the MSC and as a result it connects the channel controller 400 of the integrated pool 41 to the group switch GSW21 between a traffic channel arriving from the BSS and a traffic channel arriving from the PSTN.

After the channel controller 400 has been connected onto the line, the controller (e.g. the detector 80) starts monitoring the traffic channel arriving from the fixed network. In other words, the channel controller 400 checks whether the signalling or synchronization received from the fixed network contains characteristics of a data service supported by the channel controller 400. In this example, the channel controller 400 checks first whether the signalling arriving from the ISDNIPSTN contains a frame flag, i.e. an HDLC flag 01111110, characteristic of the V.120 protocol. If it does, the channel controller 400 is configured to use the V.120 protocol and it starts operating towards the fixed network in the manner required by the V.120 protocol. The IWF thereafter signals the status of the normal traffic channel to the MS and data transmission may begin.

The channel controller 400 starts the synchronization of the GSM traffic channel between the TAF and the IWF at the latest after the fixed network service has been identified.

If a V.120 protocol is not identified in the above-described stage, the channel controller 400 checks whether the signalling arriving from the fixed network contains a V.110 synchronization frame. If a V.110 synchronization frame is received, the channel controller 400 is configured to utilize the V.110 protocol and it starts operating towards the ISDN/PSTN in accordance with the V.110 protocol. The IWF thereafter resumes the operation according to the V.110 protocol towards the TE and signals the traffic channel status to the MS in a normal manner utilizing V.24 statuses.

If a V.110 protocol is not identified above either, the channel controller 400 checks whether a modem calling tone (1300 Hz) or a digital call indication bit sequence is received from the PSTN/ISDN. If it is, the channel controller 400 is configured to support the modem service and it starts operating according to the modem service towards the ISDN/PSTN. This means for example that an answering tone, a digital response bit sequence or a frame is transmitted and a standard modem handshaking procedure is used, which results in a modem connection. The IWF again continues operating according to the V.110 protocol towards the TE and signals the traffic channel status to the MS in a normal manner utilizing V.24 statuses.

If no modem calling tone is recognized above either, the channel controller 400 checks whether a facsimile Group 3 calling tone (1100 Hz) or a digital call indication bit sequence is received from the PSTN/ISDN. If it is, the channel controller 400 is configured to support the facsimile service and it starts operating according to this service towards the ISDN/PSTN. This means for example the transmission of an answering tone, a digital response bit sequence or a frame, and a standard facsimile Group 3 handshaking procedure, which results in a facsimile Group 3 connection according to the ITU-T T.30. The IWF again continues operating according to the V.110 protocol towards the TE and signals the traffic channel status to the MS in a normal manner by utilizing V.24 statuses and it starts operating according to the GSM Facsimile protocol.

If no data service supported by the channel controller 400 is identified, the call is either considered to have failed and it is thus released or an effort is made to synchronize the traffic channel according to a selected protocol.

The IWF may carry out identification of different protocols either in succession or simultaneously.

Partial integration of data services is also possible. For example, if only the modem service and facsimile Group 3 functions are integrated, these data services share an MSISDN number, but for example the UDI/RDI services have their own number. In this case, the channel controller of the integrated pool 41 is able to detect only the modem calling tone (1300 Hz) and the facsimile Group 3 calling tone (1100 Hz), or correspondingly the call indication bit sequences or frames.

Figure 2:
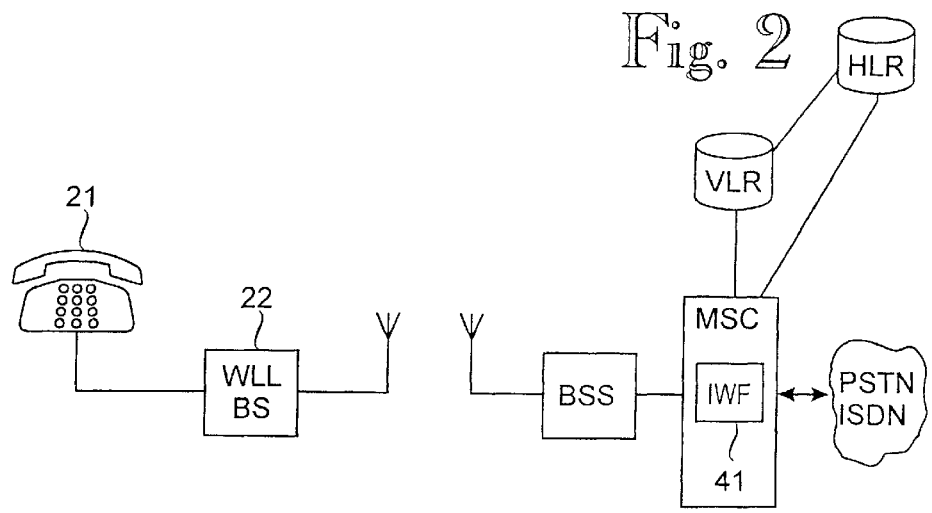
FIG. 2 shows a WLL system based on a GSM network.
Figure 3:
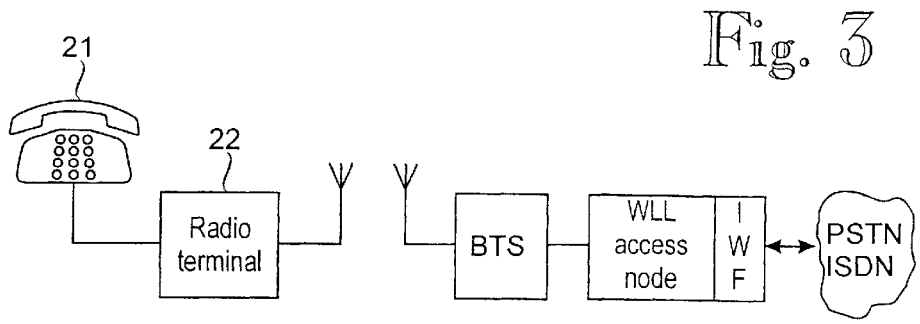
FIG. 3 shows a WLL system based on a GSM radio interface.

The invention is described above applied in a mobile system. The invention can also be applied in the WLL systems shown in FIGS. 2 and 3. The integrated IWF pool according to the invention can be implemented in a switching centre operating as a WLL access node substantially in the same manner as described above in connection with a mobile services switching centre. The invention can also be applied in a similar manner in satellite systems.

The present invention is naturally also applicable for use in high speed circuit switched data (HSCSD) transmission where several parallel traffic channels are used at a radio interface for the same data connection. In such a case, there is one high-speed traffic channel towards the PSTN/ISDN and the data service on the channel is identified as described above.

The figures and the related description are only intended to illustrate the present invention. The details of the invention may vary within the scope and spirit of the invention disclosed in the appended claims.

What is claimed is:

1. A method for setting up a data call terminating at a subscriber, characterized by receiving a call from another network to an MSISDN number of the subscriber that is common to two or more data services having adaptation functions integrated into the same adapter equipment, allocating the adaptation resource required by the data call from said integrated adapter equipment, monitoring a traffic channel arriving from the-other network by means of the allocated integrated adaptation resource, identifying the data service used by the calling party by means of signalling, synchronization or some other feature that is characteristic of the service, configuring said integrated adaptation resource to operate in the manner according to said identified data service towards the other network.

2. A method according to claim 1, characterized by identifying the data service of the calling party as the CCITT V.110 rate adaptation protocol if a V.110 synchronization frame is received from the traffic channel, configuring said allocated integrated adaptation resource to use the V. 110 protocol.

3. A method according to claim 1, characterized by identifying the data service of the calling party as the CCITT V.120 rate adaptation protocol if a V.120 frame flag is received from the traffic channel, configuring said allocated integrated adaptation resource to use the V.120 protocol.

4. A method according to claim 1, characterized by identifying the data service of the calling party as a modem or facsimile service if one of the following is received from the traffic channel: a modem or facsimile calling tone, a digital call indication bit sequence or a frame, or a handshaking sequence or frame indicating the modem capability.

5. An arrangement for setting up a data call terminating at a subscriber in a telecommunication network when the call arrives from the calling party (TE) via another network (PSTN, ISDN) without sufficient signalling support that transmits information about the data service used by the calling party, characterized in that in the telecommunication network, an adapter equipment is integrated for two or more data services such that the data services share an MSISDN number, the telecommunication network is arranged to allocate the required adaptation resource from said integrated adapter equipment in a call made to said MSISDN number, said allocated network adaptation resource (IWF) is arranged to monitor a traffic channel arriving from another network, to identity the data service used by the calling party (TE) on the basis of signalling, synchronization or some other feature that is characteristic of the service, and to configure itself to operate according to said identified data service towards the calling party.

6. An arrangement according to claim 5, characterized in that the data service used by the calling party (TE) is the CCITT V.110 or V.120 protocol, and that the signalling characteristic of said protocol comprises a V.110 synchronization frame or correspondingly a V.120 frame flag.

7. An arrangement according to claim 5, characterized in that the data service used by the calling party (TE) is a modem service or a facsimile service, and that said signalling characteristic of the protocol comprises at least one of the following: a modem or facsimile calling tone, a digital call indication bit sequence or a frame, or a handshaking sequence or frame indicating the modem capability.

8. An arrangement according to claim 5, characterized in that said telecommunication network is a mobile system, a WLL system or a satellite system.

9. An interworking function equipment in a telecommunication network for providing protocol adaptation between the network and another network when a call arrives from a calling party via the other network without sufficient signalling support that transmits information about the data service used by the calling party, characterized in that the interworking function equipment comprises integrated functions for supporting two or more data services such that the services share an MSISDN number, the interworking function equipment (IWF) is arranged to reserve network adaptation resources for a data call terminating at the subscriber (MS) but to leave the data service unspecified, the interworking function equipment (IWF) is arranged to monitor a traffic channel arriving from the other network, to identify the data service used by the calling party (TE) on the basis of signalling, synchronization or some other feature that is characteristic of the service, and to configure said allocated network adaptation resources to use said identified data service towards said calling party (TE).

10. An interworking function equipment according to claim 9, characterized in that the data service used by the calling party (TE) is the CCITT V.110 or V.120 protocol, and that the signalling characteristic of said protocol comprises a V.110 synchronization frame or correspondingly a V.120 frame flag.

11. An interworking function equipment according to claim 9, characterized in that the data service used by the calling party (TE) is a modem service or a facsimile service, and that said signalling characteristic of the protocol comprises at least one of the following: a modem or facsimile calling tone, a digital call indication bit sequence or a frame, or a handshaking sequence or frame indicating the modem capability.

12. An interworking function equipment according to claim 9, characterized in that said telecommunication network is a mobile system, a WLL system or a satellite system.

* * * * *